United States Patent [19]
Spierts et al.

[11] Patent Number: 5,289,761
[45] Date of Patent: Mar. 1, 1994

[54] DEVICE FOR MAKING A SNACK

[75] Inventors: Leon Marie F. Spierts; Gerard Matheus H. Lemmerling; Sibbelina Marijke Berg, all of Maastricht; René Louis De Fielliettaz-Goethart, Berg en Terblijt, all of Netherlands

[73] Assignee: Mora B.V., Maastricht, Netherlands

[21] Appl. No.: 870,885

[22] Filed: Apr. 20, 1992

[30] Foreign Application Priority Data

Apr. 24, 1991 [NL] Netherlands ............... 9100712

[51] Int. Cl.⁵ ............ A21C 9/00; A21C 11/00; A21D 13/00; A23L 1/00
[52] U.S. Cl. ............ 99/450.006; 99/450.2; 99/450.7
[58] Field of Search ............ 99/450.1–450.6, 99/450.7, 352–356; 426/500–502, 297; 425/112, 117, 96, 324.1; 53/210, 211, 216, 228, 465

[56] References Cited

U.S. PATENT DOCUMENTS

| | | | |
|---|---|---|---|
| 3,219,456 | 11/1965 | Matz et al. | 99/92 |
| 3,690,248 | 9/1972 | Schafer | 99/450.2 |
| 3,757,676 | 9/1973 | Pomara, Jr. | 99/450.6 |
| 3,912,433 | 10/1975 | Ma . | |
| 3,930,440 | 1/1976 | Ohkawa | 99/450.6 |
| 4,073,953 | 2/1978 | Trostmann et al. . | |
| 4,084,493 | 4/1978 | Quintana | 99/450.7 |
| 4,388,059 | 6/1983 | Ma | 425/112 |
| 4,439,124 | 3/1984 | Watanabe | 425/324.1 X |
| 4,457,225 | 7/1984 | Bakker | 426/502 X |
| 4,516,487 | 5/1985 | Madison et al. | 99/450.6 |
| 4,517,785 | 5/1985 | Masuda | 53/211 X |
| 4,608,919 | 9/1986 | Prows et al. | 99/450.6 |
| 4,691,627 | 9/1987 | Roberts | 99/450.2 X |
| 4,741,908 | 5/1988 | Brooks et al. . | |

FOREIGN PATENT DOCUMENTS

| | | | |
|---|---|---|---|
| 2428403 | 2/1980 | France | 99/450.7 |
| 1248391 | of 1971 | United Kingdom | A21C 11/04 |

*Primary Examiner*—Timothy F. Simone
*Attorney, Agent, or Firm*—Webb, Burden, Ziesenheim & Webb

[57] ABSTRACT

A snack, such as an egg roll with a substantially block shape, can be made by employing a method and device for making such a snack. The snack has a filling enclosed in at least one pancake wrapping with at least one pancake wrapping edge fused and the pancake is further folded around the pancake wrapping.

18 Claims, 4 Drawing Sheets

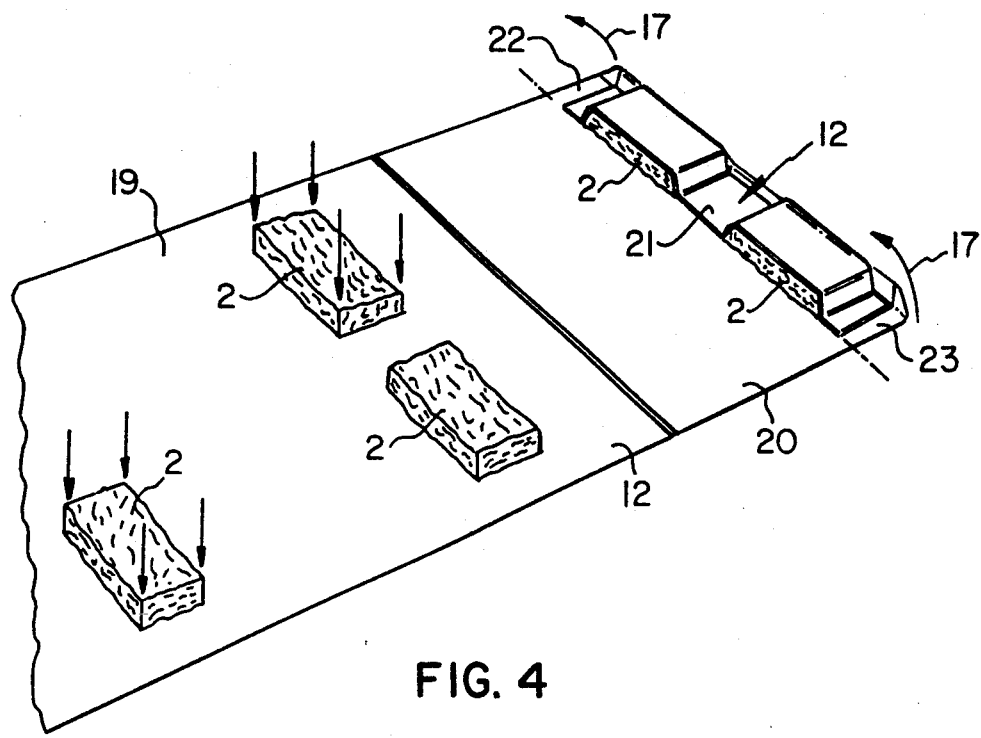
FIG. 4
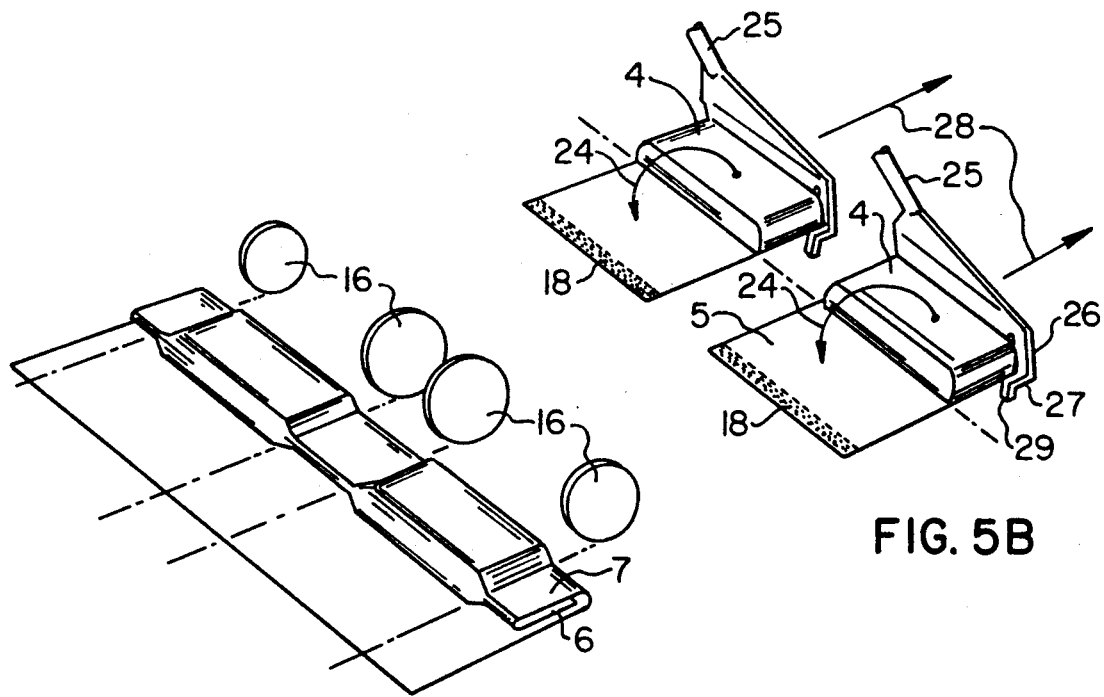
FIG. 5A
FIG. 5B

DEVICE FOR MAKING A SNACK

BACKGROUND OF THE INVENTION

The present invention relates to a snack such as an egg roll with a substantially block shape and to a device and a method for making such a snack. The invention relates more particularly to the making on industrial scale of snacks resembling as closely as possible the known flat and rectangular egg roll. This known egg roll is made according to the envelope method wherein a portion of filling is arranged on a pancake, whereafter side edges are laid over the filling and the whole is wrapped. Characteristic of this egg roll are the inward folded pancake parts on both head ends, which parts are covered by the part of the pancake wrapped therearound.

Since the pancake is manufactured from a mix of flour, water and seasonings such as salt, this pancake is substantially moisture-tight so that during (pre-)deepfrying of such an egg roll steam can accumulate inside. It has been found that it is necessary for the steam to be able to escape via the head ends. The escape of steam, certainly during deep-frying, otherwise results in dangerous situations.

The invention has for its object to provide a snack which substantially does not have the above described problem of steam accumulation, resembles the handproduced egg roll, but is nevertheless manufactured on industrial scale.

SUMMARY OF THE INVENTION

The invention is based on the insight that steam accumulation can be avoided if the inward folding of pancake parts can be omitted, while the filling is nevertheless completely enclosed. Reliable enclosure of the filling inside the pancake at the free ends is possible by pressing parts of the pancake onto one another at that location, for instance during a cutting operation for cutting off a pancake edge. The characteristic appearance of the snack is thus preserved but steam can escape between the pancake wrapping and pancake flap.

An additional aspect is that fewer layers of pancake are present at the head ends of the snack, whereby at these sides relatively more filling than pancake is present, which is very beneficial to the appreciation of the snack.

The snack according to the invention is therefore characterized in that it comprises:
i) a filling; and
ii) a pancake enclosing the filling which comprises at least one pancake wrapping which is placed around the filling and whereof at least one free wrapping edge is fused, and a pancake flap folded round the pancake wrapping and connected to the pancake wrapping.

Both free wrapping edges of the pancake wrapping are preferably fused in order to obtain a maximal resemblance to the hand-manufactured snack.

The firmness of the snack can be further improved if the pancake wrapping comprises more than one winding, such as two windings, since it has been found that when two windings are used steam accumulation is still adequately avoided.

The pancake flap preferably comprises at least one winding and is preferably attached to the pancake with an end edge provided with adhesive, whereby the characteristic lengthwise seam of the pancake flap is also recognizably present.

The fused free wrapping edge on for instance the head ends of the snack can be fused by a cutting, pressing or other operation so that at that location the fused wrapping edge is provided with a cut surface, pressure tracking or other feature of the performed fusing operation.

Another aspect of the invention relates to a device for making the above described snack according to the invention. This device comprises according to the invention:
i) a pancake station which delivers a pancake;
ii) a filling station which places a portion of filling on the pancake such that at least one pancake edge extends adjacent to the filling;
iii) a wrapping station for forming a pancake wrapping by wrapping the pancake round the filling;
iv) a closing station for fusing a free wrapping edge formed from the wrapped pancake edge, whereby the filling is enclosed in the pancake wrapping; and
v) a folding station for folding a pancake flap round the pancake wrapping.

In order to form the pancake wrapping with very simple and limited numbers of mechanical operations it is recommended that the wrapping station comprises a wrapping member with which a leading edge of the pancake is laid over the filling, wherein the wrapping member preferably comprises a vacuum beam. By making use of the transport of the pancake the filling can in this way be partially enclosed in pancake material elegantly and rapidly. The wrapped part of the pancake can thereafter be used for gripping of wrapping members since the pancake material has a markedly greater strength and more coherent behaviour than the filling.

In the forming of multiple windings a second wrapping station connects onto the closing station, wherein the second wrapping station preferably comprises a tumbling wrapper and more preferably the tumbling wrapper comprises a stop pivotable round a shaft parallel to the pancake wrapping and gripping with an edge under the pancake wrapping. Windings can thus be formed elegantly, rapidly and simply, while the pancake material remains substantially undamaged because the stop edge is preferably provided with bent guide fingers.

Finally, the invention relates to a method for making a snack according to the invention, which method comprises the steps of:
i) arranging a filling on a pancake;
ii) forming a pancake wrapping round the filling;
iii) fusing at least one free wrapping edge while closing the pancake wrapping; and
iv) forming a pancake flap round the pancake wrapping.

BRIEF DESCRIPTION OF THE DRAWINGS

Mentioned and other features of the snack, method and device for manufacturing thereof will be further elucidated in the light of the following description of a number of nonlimitative embodiments, wherein reference is made to the annexed drawing. In the drawing:

FIGS. 4 and 5 show schematically the method for manufacturing the snack of FIG. 1;

DESCRIPTION OF THE PREFERRED EMBODIMENTS

Figure 1:
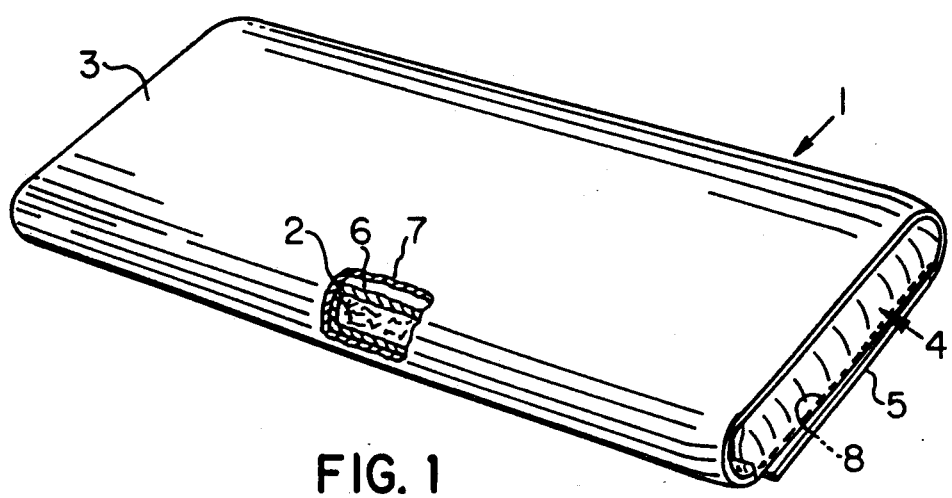
FIG. 1 shows to actual size a perspective, partly broken away view of a snack according to the invention.

FIG. 1 shows a flat, rectangular egg roll 1 according to the invention. The roll 1 contains a customary filling 2 based on bean sprouts, other ingredients and optional seasonings, in addition to a pancake 3 enveloping the filling 2. The pancake comprises a pancake wrapping 4 placed around the filling 2 and a pancake flap 5 folded round the wrapping. The pancake wrapping 4 comprises two windings, an inner winding 6 and an outer winding 7.

Characteristic of the egg roll 1 according to the invention is that on the head end sides no pancake material is folded inward but that an initially free wrapping edge is fused at that position, which is recognizable from a seam 8.

Figure 2:
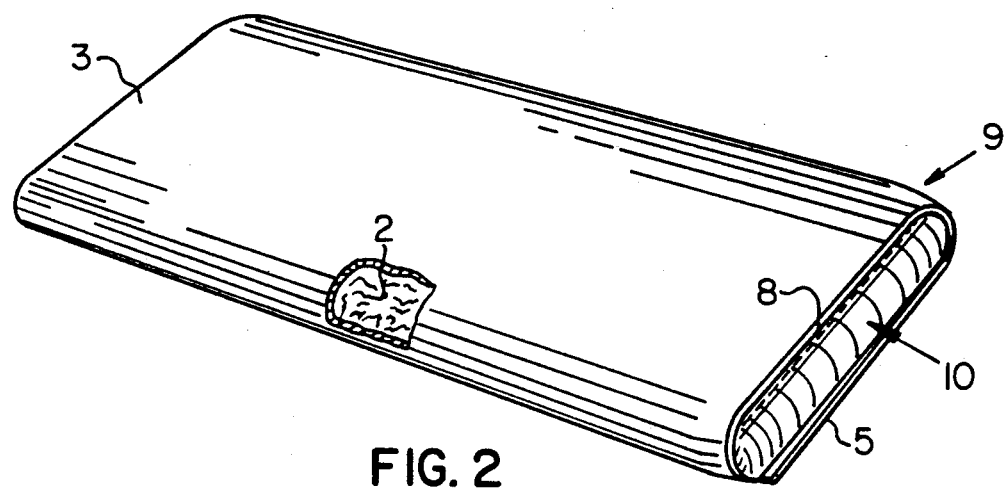
FIG. 2 shows a variant corresponding to FIG. 1 of the snack according to the invention.

FIG. 2 shows another egg roll 9 according to the invention, wherein the pancake 3 is built up from a pancake wrapping 10 and a pancake flap 5. The pancake wrapping consists in this case of only one winding.

FIG. 3 shows schematically the manner in which the egg roll 9 of FIG. 2 is made.

Figure 3A:
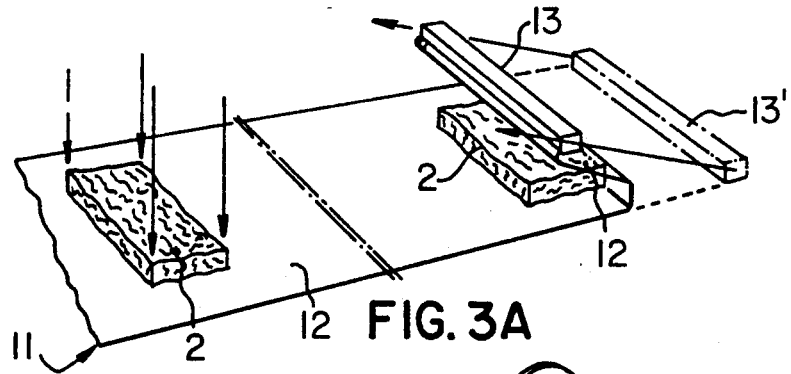
FIG. 3 shows schematically the manner of manufacturing the snack of FIG. 2.

Placed on a pancake band 11 is a portion of filling 2. After the pancake band 11 has been cut, a leading edge 12 of pancake 3 is laid over the filling 2 using a wrapping member 13 (FIG. 3A).

Figure 3B:
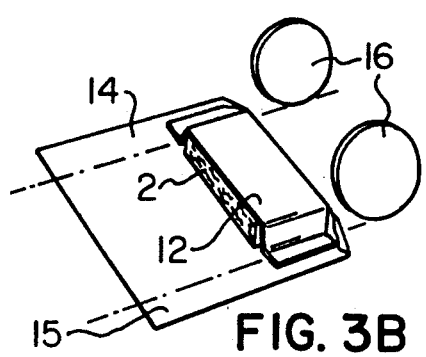
Figure 3C:
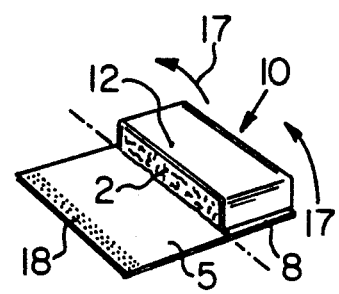

As shown in FIG. 3B, both free wrapping edges are subsequently cut off using cutting members 16, whereby, as shown in FIG. 3C, the filling 2 is enclosed in the pancake wrapping 10 since on the head ends the wrapping edges are fused to a seam 8. By means of a second wrapping operation as according to arrows 17 the pancake flap 5 is arranged round the pancake wrapping 10 and fixed thereto using a strip of adhesive 18 applied to the pancake flap.

FIGS. 4 and 5 show schematically the manner of making the egg roll 1 of FIG. 1. In this case a double-width pancake band 19 is provided with two fillings 2 in mutually adjacent positions coming from mutually adjacent filling stations (not shown). After cutting of the pancake band 19 to a part 20, the leading edge 12 is placed over the filling 2 in the same manner as in FIG. 3A, wherein located between both fillings is a pancake edge 21, and adjacently of the fillings 2 a pancake edge 22, 23. A second winding 7 is then formed as according to the arrows 17, whereafter the pancake edges 21-23 are removed using the cutting members 16. Finally, the pancake flaps of the now separated and already wrapped fillings 2 are folded round the pancake wrapping 4 as according to arrow 24, wherein use is made of a tumbling wrapper 25. Each wrapper comprises a pivotable stop 26 which grips with an edge 27 beneath the pancake wrapping 4 whereby during transport in the direction of arrows 28 the wrapping movement according to arrow 24 is performed, whereafter using bent guide fingers 29 the egg roll can pass through beneath the wrapper 25 without damaging the flap 5.

Figure 6:
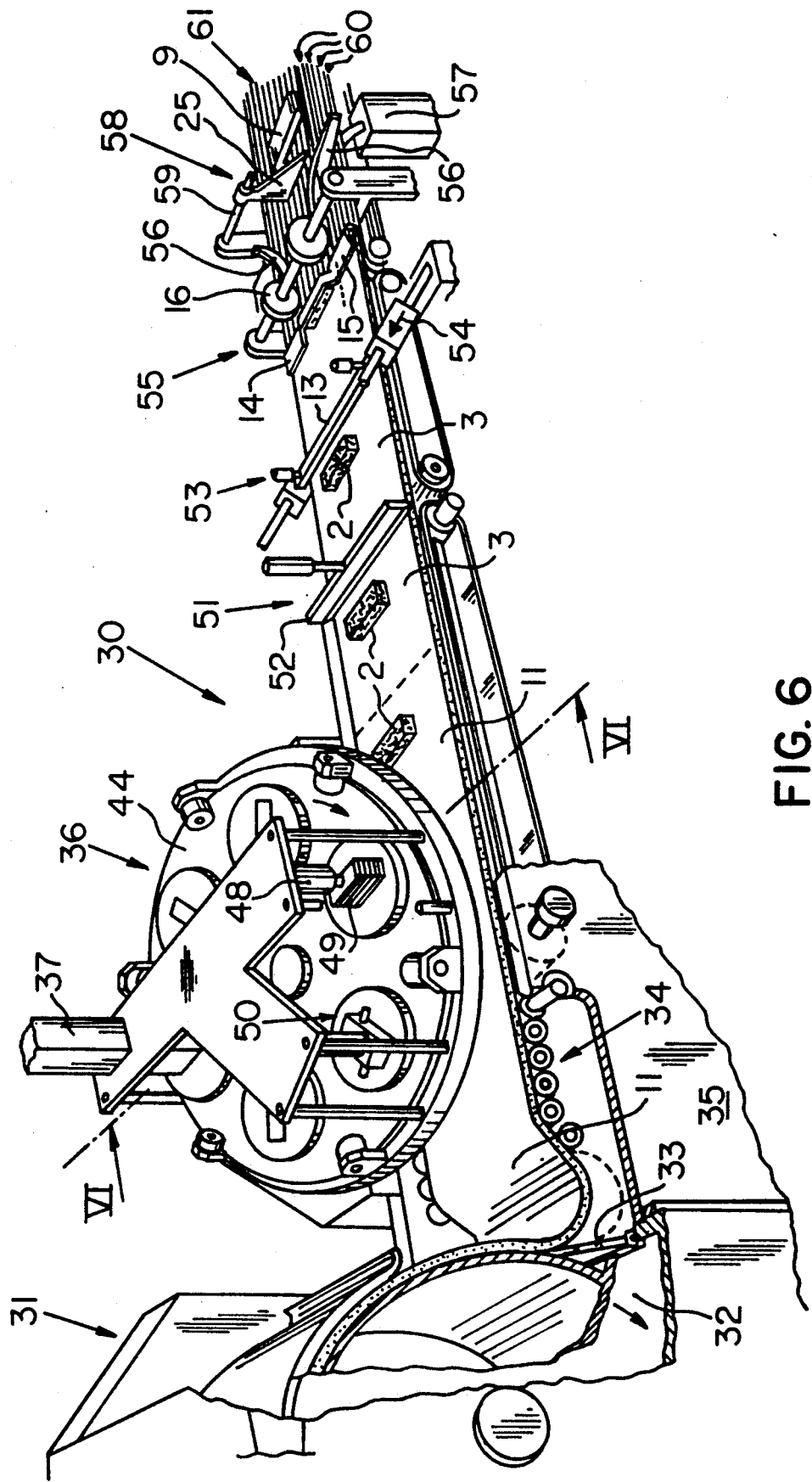
FIG. 6 shows a device for making a snack according to the invention.
Figure 7:
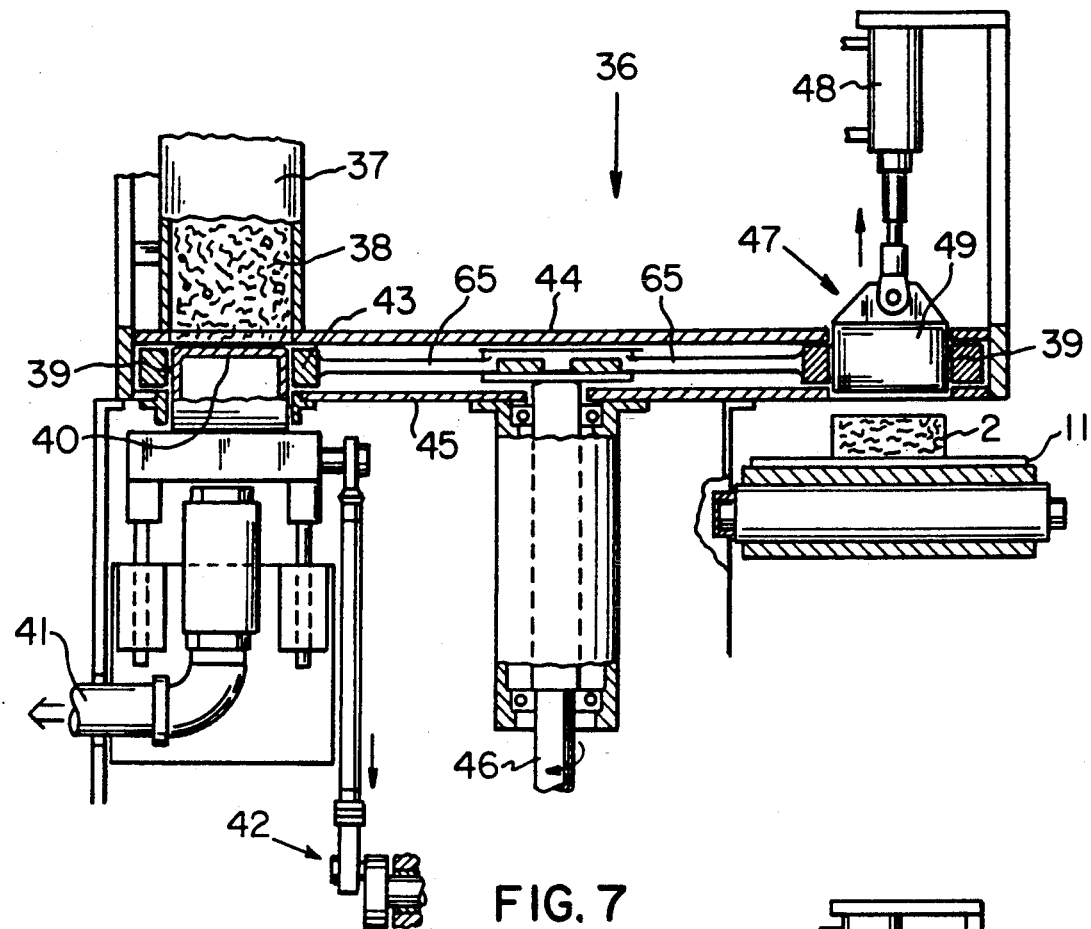
FIGS. 7 and 8 each show a section through the line VII—VII in FIG. 6 for different operating positions of the filling station.

FIG. 6 shows a device 30 for making an egg roll 9 according to the invention.

The device 30 comprises a pancake station 31 which comprises a rotating, heated drum 32 on which a pancake band 11 is prepared. Using a scraper knife 33 the pancake band is lifted from the drum 32 and taken over by a roller conveyor 34 while retaining a pancake band loop 35 between drum 32 and conveyor 34, whereby differences in transport velocities between the drum 32 and the remaining part of the device 30 can be absorbed.

In a filling station 26 the filling 2 is placed on the pancake band 11. The filling station 36 comprises a feed funnel 37 for filling material 38 to a filling chamber 39 which is provided with a perforated bottom 40 movable through the chamber 39 and connected to a vacuum line 41. The bottom 40 is movable up and downward with an eccentric drive gear 42. A large number of chambers 39 is arranged distributed over the periphery in a ring 43 located between two plates 44 and 45. Via spokes 65 connected to the ring 43 the latter can be driven rotatably with a shaft 46.

Located diametrically opposite the funnel 37 is a discharging unit 47 comprising an ejector 49 which is movable by an energizable cylinder and with which the filling 2 present in the chamber located in that position is ejected onto the pancake band 11.

Figure 8:
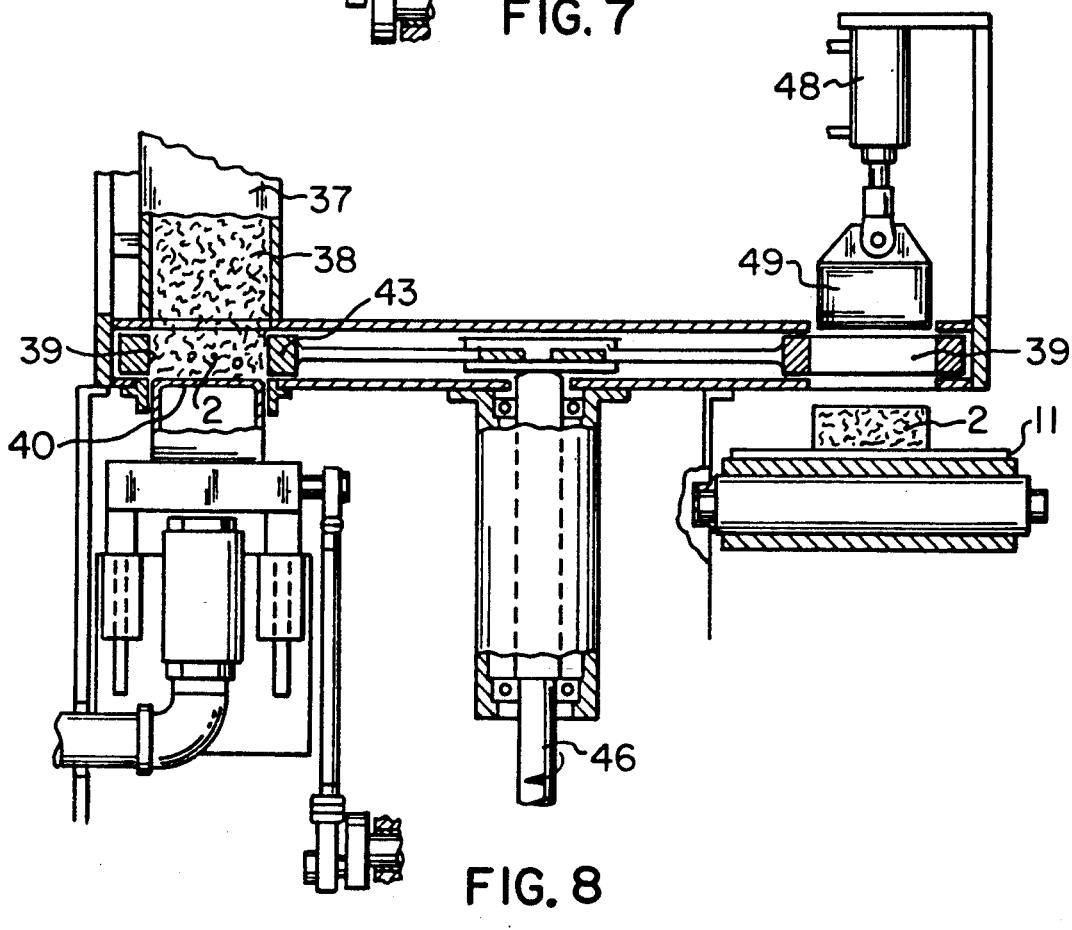

As shown in FIG. 8, the quantity of filling 2 in the chamber 39 is determined using the bottom 40 and, with the bottom 40 and the ejector 49 in the position shown, the ring 43 can be rotated past for instance a unit 50 for adding seasonings.

The pancake band 51 is subsequently cut in a cutting station 51 into pancakes 3 using movable cutting knife 52.

In the following wrapping station 53 the leading edge 12 is wrapped over the filling 2 with the wrapping member embodied as a vacuum beam 13, wherein the vacuum beam moves at an acute angle to the pancake 3 in the direction of arrow 54.

Downstream in a closing station 55 the free wrapping edges 14 and 15 formed from the wrapped pancake edge 12 are cut off with the forming of a fused pancake wrapping 10 (see FIG. 3). Remnants of pancake are carried away with a deflecting means 56 and collected in a container 57. Following thereafter in this case is a folding station 58 in which the egg roll 9 is formed using the above described wrapper 25 tumbling round the shaft 59. It can be seen clearly that the fingers 29 engage between the belts 60 of the belt conveyor 61.

If the egg roll 1 is manufactured as according to FIGS. 4 and 5, two filling stations 36 are used disposed on both sides of the pancake band 11. Another additional wrapping station similar to the folding station 58 is further received between wrapping station 53 and the closing station 55. The egg roll 1 according to the invention can thus be manufactured at double capacity.

We claim:

1. A device for making a snack having a substantially block shape with a filling packed in a pancake, comprising:
   i) a pancake station including a rotary heated drum for delivering a pancake having a plurality of edges including at least one free wrapping edge, and a leading edge;
   ii) a filling station for placing a filling on a portion of the pancake such that said free wrapping edge and said leading edge extend adjacent to the filling;

iii) a wrapping station for wrapping the pancake by wrapping the leading edge about the filling whereby a portion of the wrapped pancake creates a pancake wrapping about the filling and a portion of the pancake extends beyond the filling to form a pancake flap;

iv) a closing station for fusing said free wrapping edge formed from the wrapped pancake edge, whereby the filling is enclosed in said pancake wrapping; and v) a folding station for folding the pancake flap around said pancake wrapping.

2. A device as claimed in claim 1, wherein the closing station comprises at least one cutting member which cuts off a part of the free wrapping edge adjacent the filling and closes the pancake wrapping.

3. A device as claimed in claim 1, wherein a pancake edge extends on both sides of the filling and the closing station comprises two cutting members.

4. A device as claimed in claim 1 wherein the wrapping station comprises a wrapping member with which a leading edge of the pancake is laid over the filling.

5. A device as claimed in claim 4, wherein the wrapping member comprises a vacuum beam.

6. A device as claimed in claim 1, wherein a second wrapping station connects onto the closing station.

7. A device as claimed in claim 6 wherein the second wrapping station comprises a tumbling wrapper.

8. A device as claimed in claim 7, wherein the tumbling wrapper comprises a pivotal stop having a gripping edge that grips the pancake beneath the pancake wrapping.

9. A device as claimed in claim 8, wherein the stop edge includes a plurality of bent guide fingers.

10. A device as claimed in claim 1, wherein the pancake station delivers a pancake band and arranged upstream of the wrapping station for the pancake wrapping is a cutting station for the pancake band.

11. A device for making a snack having a substantially block shape, comprising:
i) delivery means for delivering a pancake having a plurality of edges including at least one free wrapping edge, and a leading edge, wherein said delivery means includes a rotary heated drum;
ii) means for wrapping a portion of said pancake around the filling, such that said free wrapping edge and said leading edge extend adjacent to the filling;
iii) means for fusing at least one said free wrapping edge while closing said pancake wrapping; and
iv) means for folding said flap around said pancake wrapping.

12. A device for making a snack having a substantially block shape with a filling packed in a pancake, comprising:
i) a pancake station for delivering a pancake having a plurality of edges including at least one free wrapping edge, and a leading edge;
ii) a filling station for placing a filling on a portion of said free wrapping edge and such that said leading edge extends adjacent to the filling;
iii) a wrapping station for wrapping the pancake by the leading edge about the filling whereby a portion of the wrapped pancake creates a pancake wrapping about the filling and a portion of the pancake extends beyond the filling to form a pancake flap;

iv) a closing station including at least one cutting member which cuts off part of said free wrapping edge adjacent the filling and closes said pancake wrapping for fusing said free wrapping edge formed from the wrapped pancake edge, whereby the filling is enclosed in said pancake wrapping; and v) a folding station for folding the pancake flap around said pancake wrapping.

13. A device for making a snack having a substantially block shape with a filling packed in a pancake, comprising:
i) a pancake station for delivering a pancake having a plurality of edges including at least one free wrapping edge, and a leading edge;
ii) a filling station for placing a filling on a portion of the pancake such that said free wrapping edge and said leading edge extend adjacent to the filling and a pancake edge extends on both sides of the filling;
iii) a wrapping station for wrapping the pancake by the leading edge about the filling whereby a portion of the wrapped pancake creates a pancake wrapping about the filling and a portion of the pancake extends beyond the filling to form a pancake flap;
iv) a closing station including two cutting members for fusing said free wrapping edge formed from the wrapped pancake edge, whereby the filling is enclosed in said pancake wrapping; and
v) a folding station for folding the pancake flap around said pancake wrapping.

14. A device for making a snack having a substantially block shape with a filling packed in a pancake, comprising:
i) a pancake station for delivering a pancake having a plurality of edges including at least one free wrapping edge, and a leading edge;
ii) a filling station for placing a filling on a portion of the pancake such that said free wrapping edge and said leading edge extend adjacent to the filling;
iii) a wrapping station including a vacuum beam for wrapping the pancake by the leading edge about the filling whereby a portion of the wrapped pancake creates a pancake wrapping about the filling and a portion of the pancake extends beyond the filling to form a pancake flap;
iv) a closing station for fusing said free wrapping edge formed from the wrapped pancake edge, whereby the filling is enclosed in said pancake wrapping; and
v) a folding station for folding the pancake flap around said pancake wrapping.

15. A device for making a snack having a substantially block shape with a filling packed in a pancake, comprising:
i) a pancake station for delivering a pancake having a plurality of edges including at least one free wrapping edge, and a leading edge;
ii) a filling station for placing a filling on a portion of the pancake such that said free wrapping edge and said leading edge extend adjacent to the filling;
iii) a first wrapping station for wrapping the pancake by the leading edge about the filling and a second wrapping station for folding a second pancake around said pancake wrapping wherein said second wrapping station is a tumbling wrapper;
iv) a closing station connected to said second wrapping station for fusing said free wrapping edge formed from the wrapped pancake edge, whereby the filling is enclosed in said pancake wrapping; and v) a folding station for folding the pancake flap around said pancake wrapping.

16. The device of claim 15, wherein the tumbling wrapper includes a pivotable stop having a gripping edge that grips the pancake beneath said pancake wrapping.

17. The device of claim 16, wherein said gripping edge includes a plurality of bent guide fingers.

18. A device for making a snack having a substantially block shape with a filling packed in a pancake, comprising:

i) a pancake station for delivering a pancake band having a plurality of edges including at least one free wrapping edge, and a leading edge;

ii) a filling station for placing a filling on a portion of the pancake such that said free wrapping edge and said leading edge extend adjacent to the filling;

iii) a wrapping station for wrapping the pancake by the leading edge about the filling whereby a portion of the wrapped pancake creates a pancake wrapping about the filling and a portion of the pancake extends beyond the filling to form a pancake flap;

iv) a closing station for fusing said free wrapping edge formed from the wrapped pancake edge, whereby the filling is enclosed in said pancake wrapping;

v) a folding station for folding the pancake flap around said pancake wrapping; and vi) a cutting station located upstream of said wrapping station for cutting said pancake band.

* * * * *